Feb. 10, 1931.    I. W. ROBERTSON    1,792,187
METHOD FOR MAKING DIPPED RUBBER GOODS
Filed Aug. 3, 1928
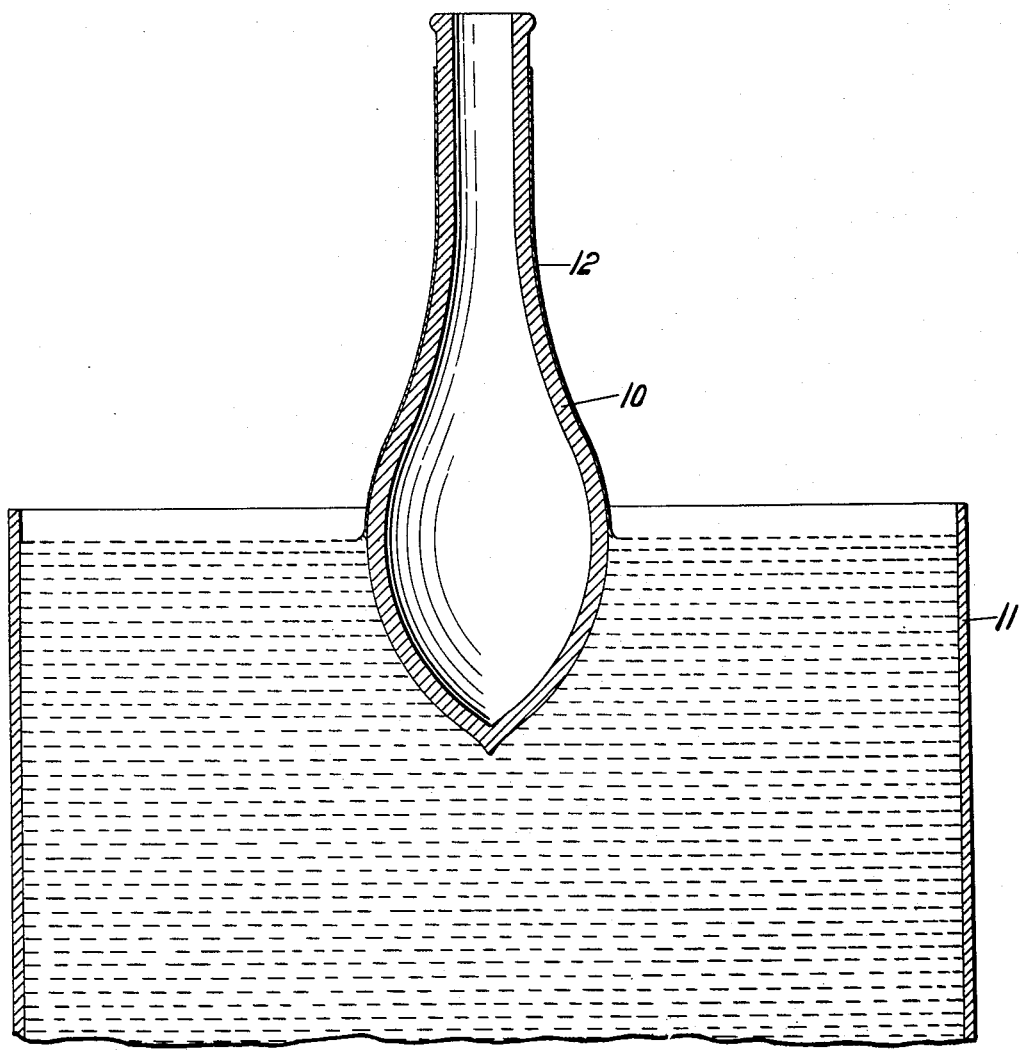
INVENTOR.
ISAAC W. ROBERTSON.
BY Ely H Barrow
ATTORNEYS.

Patented Feb. 10, 1931

1,792,187

UNITED STATES PATENT OFFICE

ISAAC W. ROBERTSON, OF AKRON, OHIO, ASSIGNOR TO THE THERMO PROCESS COMPANY, OF AKRON, OHIO, A CORPORATION OF OHIO

METHOD FOR MAKING DIPPED RUBBER GOODS

Application filed August 3, 1928. Serial No. 297,285.

This invention relates to methods for making dipped rubber goods.

Heretofore, the manufacture of dipped rubber goods has been carried out by the use of solutions of rubber in volatile, explosive solvents, such as benzine, gasoline, etc. In dipping goods from these solutions, the forms of the desired shapes are first dipped in the solution in an inverted position, then elevated and permitted to drain for a short time, and finally are turned upright, the solution, an excess of which tends to cling to the lower end of the form, distributing itself over the surface of the form before the coating on the form sets and providing a substantially uniform coating on the form. The goods are then dried, the dipping and drying steps being repeated until a coating of the desired thickness is applied to the forms. The beads or rings are then rolled on the goods and they are vulcanized on the forms and finally are stripped therefrom.

It has been proposed to manufacture dipped rubber goods from water dispersions of rubber, such as latex. These dispersions have quite different properties from rubber solutions. They are much less viscous and coatings of the latex on the form set or congeal quite rapidly. Dipping of forms in latex heretofore has been practiced by substantially the method employed for dipping in rubber solutions, but the product has not been entirely satisfactory.

The setting of latex seems to be in the nature of a crystallization, and when the forms have been turned or inverted to secure a uniform distribution of the coating, it has been found that the distribution has not been uniform, due to rapid setting, and, moreover, the texture of the finished article is impaired, this apparently being due to the movement of the particles or crystals of rubber over each other, rendering the article somewhat granular in nature.

The present invention has for its object the provision of a method for dipping rubber goods from rubber dispersions such as latex, whereby articles such as balloons, gloves, cots, etc., of uniform, fine-textured, filmy rubber are secured.

According to the invention, the dipping of the forms is carried out in the usual way, excepting that the rate of removal of the forms is so timed that the coating sets on the forms as they are being withdrawn. This rate of removal has to be determined for any given dispersion, the variations in the properties of the dispersions necessitating variations in the rate of withdrawal in order that the setting shall take place as required.

In practicing this method, the forms are dipped and are then slowly elevated from the dispersion, giving the coating time to set on the form just above the surface of the latex so that when completely removed from the dispersion, only a small globule of the dispersion on the bottom of the form will remain unset or uncongealed. Upon inverting the form, this globule flattens out or distributes itself to some extent on the extreme end of the form, making a small area of the article at its extreme end slightly heavier than the rest of the article which is of uniform thickness and of fine, silky texture.

Whether or not the film of latex is flowing upon the form by reason of too speedy withdrawal may be determined by observation under any circumstances since at quite fast rates the formation of thickened patches where uneven flow takes place appear, also cracks or creases appear and even at somewhat slower rates the flowing of latex to the end of the form causes the formation of a large teat which upon inversion of the form will flow back and form a streak. Variations in temperature and humidity and also latex mixes of various concentrations or percentages of solids require different rates of withdrawal to insure that the film of latex sets upon the form just above the surface of the latex from which it is withdrawn. The rates may best be determined under working conditions by a simple series of tests at various speeds.

For example, a latex mix approximately the consistency of natural latex having thirty-six percent of solids including compounding ingredients at a temperature of 78° F. and forty-six percent relative humidity requires removal of the form at a rate such that the surface speed of issuance will be about 3.5 inches per minute to obtain the best results. At higher temperatures and with lower relative humidity the speed of removal may be increased because the rate of setting increases. With latex mixes of greater consistency, the rate of removal must be decreased because the thicker film deposited requires longer time to set.

The dipping is dried and repeated dippings and dryings are made if desired to produce the desired quality of goods. The articles are then completed. The dryings of the latex coatings are preferably performed by the use of internally heated forms which drives the moisture outwardly from the goods, the rings or beads are rolled on the dried goods and then they are vulcanized, preferably in a bath of boiling water.

In carrying out this invention, somewhat improved results are obtained by using a form shaped at its lower end as shown in the accompanying drawing which illustrates a balloon form in cross-section in a dipping tank.

The balloon form 10 is dipped into the tank 11 containing a rubber dispersion such as latex with the usual compounding and vulcanizing ingredients. The form 10 is pointed or tit-shaped at its upper end so that the amount of the rubber dispersion clinging to the end of the form due to capillary action as it is removed from the liquid is reduced to a minimum.

The coating on the form 10 is indicated at 12 and the rate of withdrawal of the form is so governed that this coating congeals slightly above the surface of the dipping liquid as the form is withdrawn.

It will be apparent from the foregoing that by the invention a greatly improved article of rubber dipped from latex is provided. Obviously modifications of the specific procedure set forth may be made without departing from the spirit of the invention or the scope of the appended claims.

What is claimed is:—

1. That method of dipping rubber goods from water dispersions of rubber which comprises inserting forms having pointed or tit-shaped upper ends in inverted position in the dispersion, removing the forms at such rate that the coating of the dispersion on the forms will congeal on the forms adjacent the surface of the dispersion as the forms are removed, turning the forms upright to distribute the small globule of the dispersion clinging to the extreme ends of the forms, drying the coatings on the forms, and repeating the dipping and drying steps to produce articles of the desired thickness.

2. The method of dipping rubber goods from water dispersions of rubber which comprises inserting forms having pointed or tit-shaped upper ends in inverted position in the dispersion, removing the forms at such rate that the coating of the dispersion on the forms will congeal on the forms adjacent the surface of the dispersion as the forms are removed, turning the forms upright to distribute the small globule of the dispersion clinging to the extreme ends of the forms, and drying the coatings on the forms.

3. That method of dipping rubber goods from water dispersions of rubber which comprises inserting forms having pointed or tit-shaped upper ends in inverted position in the dispersion, removing the forms at such rate that the coating of the dispersion on the forms will congeal on the forms adjacent the surface of the dispersion as the forms are removed, and turning the forms upright to distribute the small globule of the dispersion clinging to the extreme ends of the forms.

4. That method of dipping rubber goods from water dispersions of rubber which comprises inserting forms in inverted position in the dispersion, removing the forms at such rate that the coating of the dispersion on the forms will congeal on the forms adjacent the surface of the dispersion as the forms are removed, turning the forms upright to distribute the small globule of the dispersion clinging to the extreme ends of the forms, drying the coatings on the forms, and repeating the dipping and drying steps to produce articles of the desired thickness.

5. That method of dipping rubber goods from water dispersions of rubber which comprises inserting forms in inverted position in the dispersion, removing the forms at such rate that the coating of the dispersion on the forms will congeal on the forms adjacent the surface of the dispersion as the forms are removed, turning the forms upright to distribute the small globule of the dispersion clinging to the extreme ends of the forms, and drying the coatings on the forms.

6. That method of dipping rubber goods from water dispersions of rubber which comprises inserting forms in inverted position in the dispersion, removing the forms at such rate that the coating of the dispersion on the forms will congeal on the forms adjacent the surface of the dispersion as the forms are removed, and turning the forms upright to distribute the small globule of the dispersion clinging to the extreme ends of the forms.

7. In the method of dipping rubber goods from latex, the step of inserting the forms in the latex and removing the forms from the latex at such a rate that the latex coating on the form will congeal just above the surface of the latex.

8. In the method of dipping rubber goods from water dispersions of rubber, the step of inserting the forms in the dispersion and removing the forms from the dispersion at a rate determined by the rate of setting of the coating of the dispersion on the forms.

9. That method of dipping rubber goods from latex which comprises inserting forms into the latex, and governing the rate of removal of the forms by the rate of setting of the latex coating on the forms.

ISAAC W. ROBERTSON.